(12) United States Patent
Ginzburg

(10) Patent No.: US 10,012,739 B1
(45) Date of Patent: Jul. 3, 2018

(54) RADIATION DOSIMETER AND METHOD OF OPERATION

(71) Applicant: Rotem Ind. Ltd., Mishor Yamin (IL)

(72) Inventor: Dimitry Ginzburg, Mishor Yamin (IL)

(73) Assignee: ROTEM IND. LTD., Mishor Yamin (IL)

( * ) Notice: Subject to any disclaimer, the term of this patent is extended or adjusted under 35 U.S.C. 154(b) by 0 days.

(21) Appl. No.: 15/846,219

(22) Filed: Dec. 19, 2017

Related U.S. Application Data

(60) Provisional application No. 62/551,808, filed on Aug. 30, 2017.

(51) Int. Cl.
*G01T 1/02* (2006.01)

(52) U.S. Cl.
CPC .................... *G01T 1/026* (2013.01)

(58) Field of Classification Search
CPC ....................................... G01T 1/026
USPC ...................................... 250/370.07
See application file for complete search history.

(56) References Cited

U.S. PATENT DOCUMENTS 6,172,368 B1 * 1/2001 Tarr ................ G01T 1/026
250/337

\* cited by examiner

*Primary Examiner* — David Porta
*Assistant Examiner* — Meenakshi Sahu
(74) *Attorney, Agent, or Firm* — Mark M. Friedman

(57) ABSTRACT

A radiation dosimeter records absorbed radiation using a passive radiation sensor having one or more radiation-sensitive elements (RSEs) and a radiation-insensitive element (RIE). Floating gate MOSFET technology is used for both the RSEs and the RIE. A reader is connected to the sensor by means of a switching channel in order to pre-charge the sensor before exposure and to read the sensor voltage signals after exposure to radiation. The voltage signals of the RIE are used to correct for the spurious effect of voltage retention loss in the RSEs.

20 Claims, 9 Drawing Sheets

FIG. 5

| Contact | Idle mode | Read mode | Pre-Charge mode | Discharge mode |
|---------|-----------|-----------|-----------------|----------------|
| CG      | =SUB      | Vg        | 8 V             | -4 V           |
| TG      | =SUB      | =SUB      | -4 V            | 8 V            |
| DNW     | =SUB      | =CG       | 8 V             | 8 V            |
| ND      | =SUB      | Vd        | =SUB            | =SUB           |
| SUB     |           | 0         | 0               | 0              |

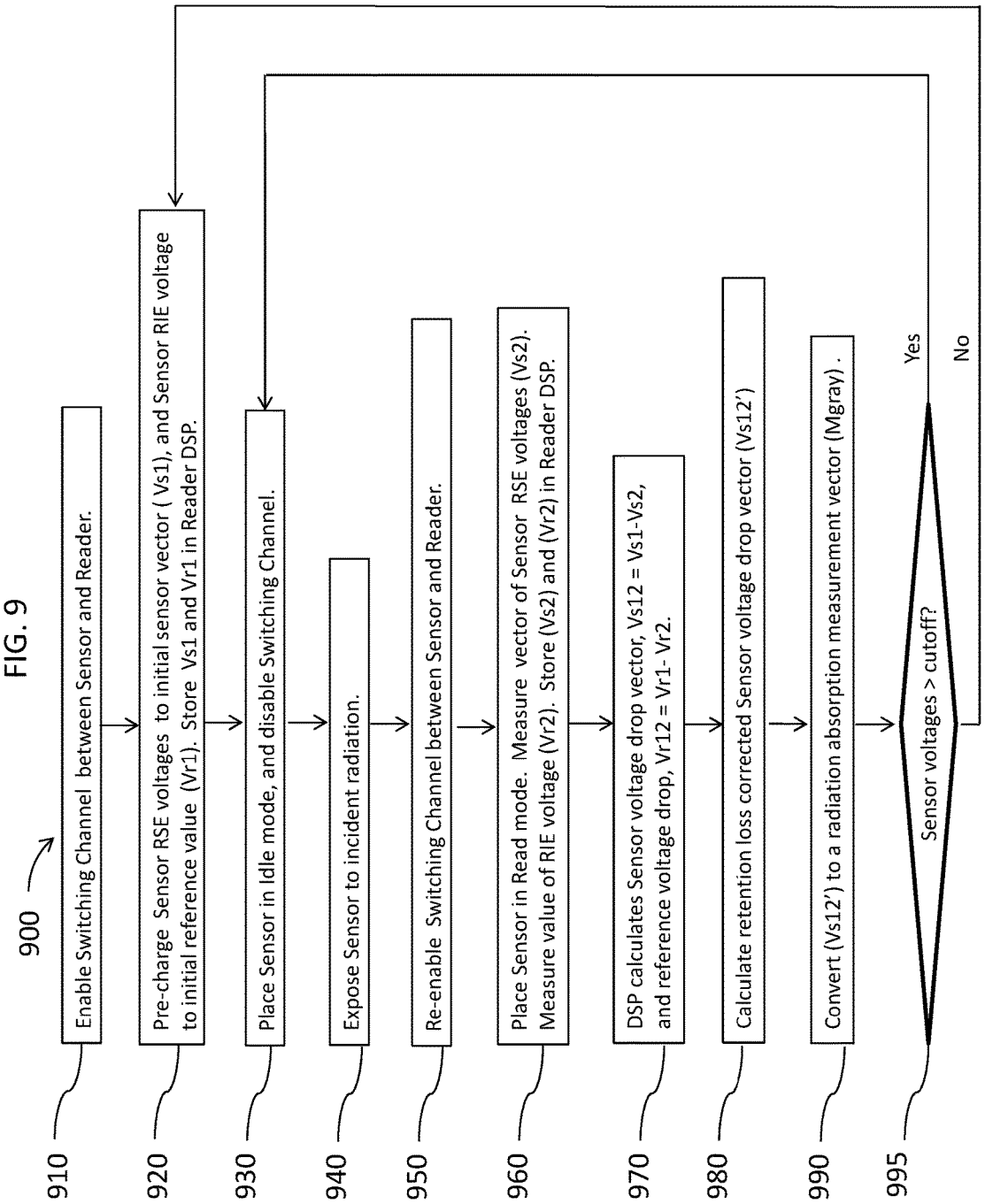

RADIATION DOSIMETER AND METHOD OF OPERATION

FIELD AND BACKGROUND OF THE INVENTION

The invention relates to radiation dosimeters and specifically to those having a passive radiation sensor, which is able to keep a record of an absorbed radiation dose, without using a power source and without utilizing external recording mechanisms.

Radiation dosimeters have wide application to a variety of industries, including medical X-ray and nuclear imaging facilities, nuclear power plants, nuclear spent fuel disposal, homeland security radiation monitoring, and food irradiation systems.

US patent application publication US2015/0162369 A1, entitled "Single-poly floating gate solid state direct radiation sensor using STI dielectric and isolated Pwells", discloses a passive radiation sensor utilizing floating-gate MOSFET (i.e. Metal Oxide Silicon Field Effect Transistor) technology. In such a sensor, the gate voltage of a pre-charged transistor decreases in response to radiation absorbed by the sensor. By means of pre-determined calibration curves, a measured decrease in gate voltage may be converted to radiation absorption, expressed in physical units of Grays, where one Gray equals one Joule of absorbed radiation energy per kilogram of exposed mass. In some applications, the radiation absorption may be further converted to a personal dose equivalent, expressed in units of Sieverts, which accounts for the relative health effects of different kinds of ionizing radiation and different incident particle energies. One Sievert is equivalent to the amount of radiation absorption needed to produce the same effect on living tissue as one Gray of high-penetration x-rays.

Floating-gate MOSFET radiation sensors may be subject to charge loss, or gain, resulting from mechanisms of different nature, such as thermal stress, which occur in the absence of incident radiation and which reduce the gate voltage of the MOSFET. This phenomenon, known as "voltage retention loss", depends upon circuit design as well as various ambient factors, such as temperature of the sensor during operation. Voltage retention loss, if uncompensated, will produce false readings of the radiation absorption.

Various methods of accounting for the effect of voltage retention loss have been reported in the literature. For example, U.S. Pat. No. 6,172,368 issued to Tarr, on Jan. 9, 2001, discloses the use of two radiation-sensitive floating-gate transistors, preferably having charges of opposite polarity, and measuring the difference between the threshold voltages of the two transistors. One difficulty with this approach is that both transistors must be matched in their sensitivity to absorbed radiation over a wide range of incident particle energies and must be matched in their voltage retention loss over a wide range of ambient temperatures. This is difficult to achieve in practice.

SUMMARY OF THE INVENTION

The present invention is a radiation dosimeter and a method of operation. The dosimeter of the present invention overcomes previous limitations and difficulties by utilizing a passive radiation sensor and a reader, in which the passive radiation sensor consists of one or more radiation-sensitive elements, referred to hereinafter as RSEs, together with a radiation-insensitive element, referred to hereinafter as an RIE. In a preferred embodiment, the voltage retention loss of the RSEs and of the RIE are matched over an operative range of ambient temperatures.

The dosimeter of the present invention may be used for many types of ionizing radiation and for a range of incident particle energies. For example, the ionizing radiation may be X-rays produced by bremsstrahlung, or particles produced by radioactive decay, such as alpha particles, beta particles, and gamma photons. Typically, the incident particle energies may extend over a wide range; for example, from 20 kilo-electron-volts (KeV) to 3 mega-electron-volts (MeV).

In the dosimeter of the present invention, the act of reading the voltages of the passive radiation sensor does not alter them. Thus, if the absorbed radiation dose in a single exposure time interval is small, it is possible to read the sensor many times after a single pre-charging operation.

The radiation dosimeter of the present invention has a passive radiation sensor, which includes:
  (a) an RSE configured to be charged to a first voltage, which is responsive to incident radiation and to a first voltage retention loss;
  (b) an RIE configured to be charged to a second voltage, which is responsive to a second voltage retention loss; and
  (c) a sensor interface associated with both the RSE and the RIE so to enable communication with an external reader;
  in which the first voltage retention loss is proportional to the second voltage retention loss over a range of operating temperature.

According to one feature of certain preferred implementations of the dosimeter, the sensor has one or more additional RSEs.

According to one feature of certain preferred implementations of the dosimeter, the RSE and RIE include floating gate MOSFETs.

According to another feature of certain preferred implementations of the dosimeter, the range of operating temperature is from −40 to +60 degrees Celsius.

According to yet another feature of certain preferred implementations of the dosimeter, a response of the first voltage to incident radiation is substantially uniform over a range of incident radiation particle energies. The range may be, for example, from 20 kilo-electron-volts to 3 mega-electron-volts.

According to one feature of certain preferred implementations of the dosimeter, the dosimeter includes a reader having an electrical power source, a digital signal processor, and a reader interface. The digital signal processor may be configured to calculate a voltage retention loss corrected voltage drop, and it may include a pre-determined calibration curve which relates the voltage retention loss corrected voltage drop to a quantity of absorbed radiation.

According to one feature of certain preferred implementations of the dosimeter, the dosimeter includes a switchable channel which is configured to transfer electrical signals and electrical power between the sensor and the reader. The electrical signals may include voltages of the RSE and the RIE. The switchable channel may have one or more electromechanical relays, a wireless communication link, and/or a universal serial bus. The switchable channel may also have a cradle. Furthermore, the switchable channel may be integrated together with the reader and the sensor into a single unit.

The method of operation of the present invention includes the following steps:

(a) Providing a sensor with at least one RSE, an RIE, and a sensor interface associated with the RSE(s) and the RIE;
(b) Providing a reader having an electrical power source, a digital signal processor, and a reader interface;
(c) Providing a switchable channel in communication with the reader and the sensor;
(d) Enabling a transfer of electrical signals and electrical power between the reader and the sensor;
(e) Pre-charging the RSE(s) and the RIE;
(f) Measuring a pre-exposure sensor vector, Vs1, whose components correspond to the voltage(s) of the RSE(s).
(g) Measuring a pre-exposure reference value, Vr1, corresponding to the voltage of the RIE;
(h) Disabling the transfer of electrical signals and electrical power between the reader and the sensor;
(i) Exposing the sensor to incident radiation over an interval of time;
(j) Re-enabling the transfer of electrical signals and electrical power between the sensor and the reader;
(k) Measuring a post-exposure sensor vector, Vs2, whose components correspond to the voltage(s) of the RSE(s);
(l) Measuring a post-exposure reference value, Vr2, corresponding to the voltage of the RIE;
(m) Calculating a sensor voltage drop vector, Vs12, equal to Vs1−Vs2;
(n) Calculating a reference voltage drop value, Vr12, equal to Vr1−Vr2;
(o) Calculating a voltage retention loss corrected sensor voltage drop vector, Vs12'; and
(p) Converting Vs12' to a radiation absorption measurement vector, Mgray.

According to one feature of certain preferred implementations of the method, an additional step (q) calculates a personal radiation dose measurement value, Msievert.

According to another feature of certain preferred implementations of the method, steps (d) through (p) are repeated to determine a time sequence of radiation absorption measurement vectors.

According to yet another feature of certain preferred implementations of the method, steps (d) through (q) are repeated to determine a time sequence of personal radiation dose measurements.

BRIEF DESCRIPTION OF THE DRAWINGS

The invention is described herein, by way of example only, with reference to the accompanying drawings, wherein:

FIG. 5 shows an exemplary switching matrix for changing the operational mode of an RSE.

FIG. 9 is a flow chart showing an exemplary method of operation for the radiation dosimeter of FIG. 1.

DESCRIPTION OF PREFERRED EMBODIMENTS

The present invention is a radiation dosimeter and method of operation. The principles of the present invention may be better understood with reference to the drawings and the accompanying description.

Figure 1:
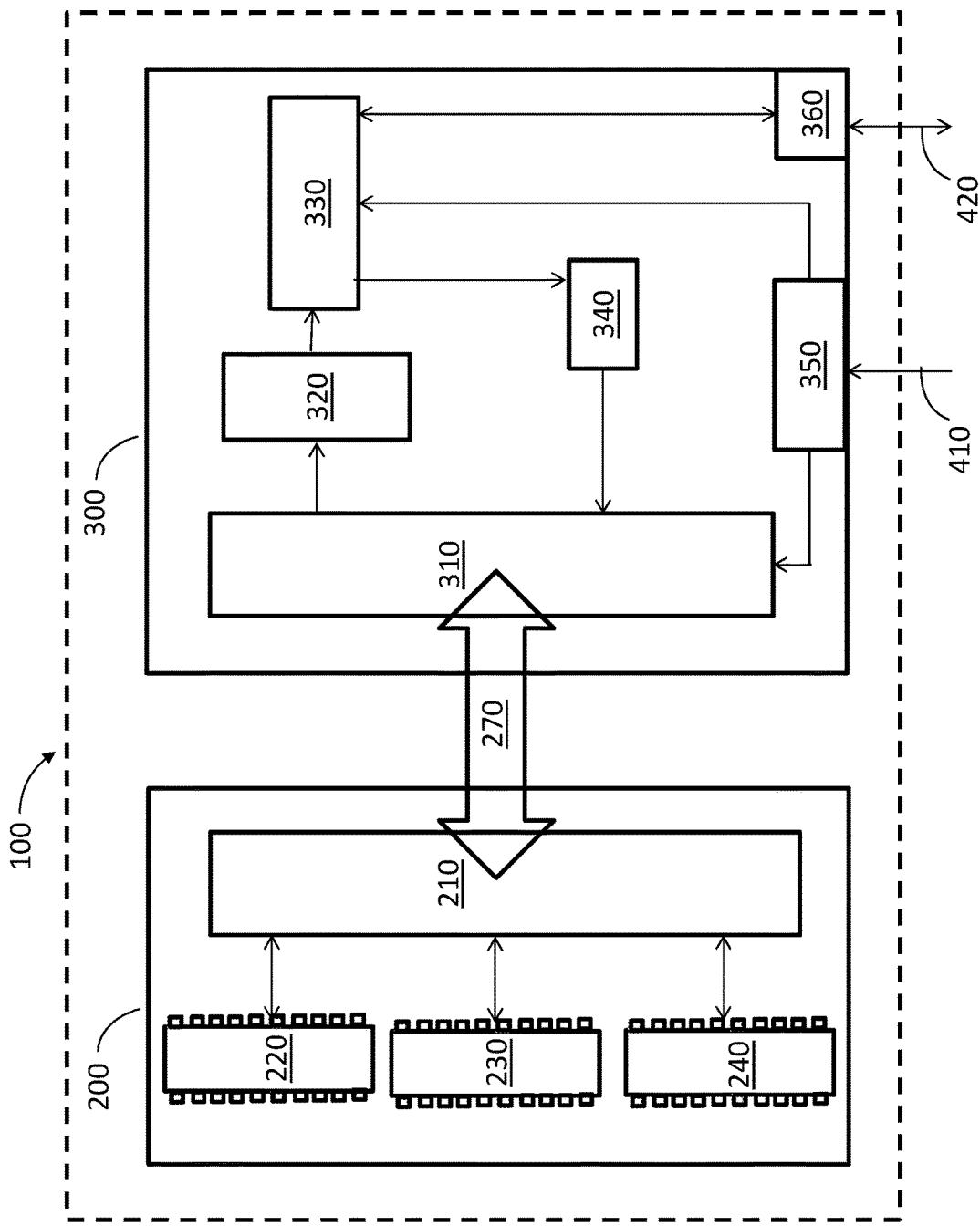
FIG. 1 is a block diagram of an exemplary radiation dosimetry system according to an embodiment of the invention.

Referring now to the drawings, FIG. 1 is a block diagram of an exemplary embodiment of a radiation dosimeter 100 according to this invention. System 100 consists of a sensor 200 in communication with a reader 300 via a switching channel 270.

Sensor 200 consists of two RSEs 220 and 240, an RIE 230, and a sensor interface 210. In a preferred embodiment, RSE 220 is designed to have high sensitivity to incident particles of low energy, such as X-rays with kinetic energies below 100 KeV; and RSE 240 is designed to have high sensitivity to incident particles of high energy, such as X-rays or gamma rays with kinetic energies above 100 KeV.

It should be noted that sensor 200 may, in simple dosimetry applications, consist of only one RSE, and, in more complex dosimetry applications, may consist of an array of three or more RSEs. FIG. 1 illustrates a sensor 200 consisting of two RSEs for the sake of clarity and economy of presentation.

When connected, switching channel 270 permits the transfer of electrical signals between sensor 200 and reader 300, and a transfer of electrical power from reader 300 to sensor 200. When the switching channel 270 is disconnected, sensor 200 acts as a passive radiation sensor, that is, it operates without a need for electrical power.

Switching channel 270 may be implemented in a variety of ways. For example, it may consist of a set of electromechanical relays, which provide protection from uncontrolled voltage surges that may occur during switching of electrical power. Alternatively, switching channel 270 may be a universal serial bus cable connecting the sensor and reader, which is attached or detached mechanically. Still another alternative is a switching channel which is wireless. For example, the communication of data and the provision of electrical power from reader to sensor may be implemented by means of radiofrequency (RF) signals, as is known to those skilled in the field RF Identification (RFID) devices.

Reader 300 preferentially consists of a reader interface 310, which receives electrical signals from the sensor, an analog-to-digital converter (ADC) 320, a digital signal processor (DSP) 330, a reader interface controller 340, a voltage source 350 which receives electrical power via electrical input 410 from a power source external to system 100, and a peripheral interface 360, which enables data to flow via two-way data channel 420 to and from external peripheral devices, such as a general-purpose computer or a display terminal.

Figure 2:
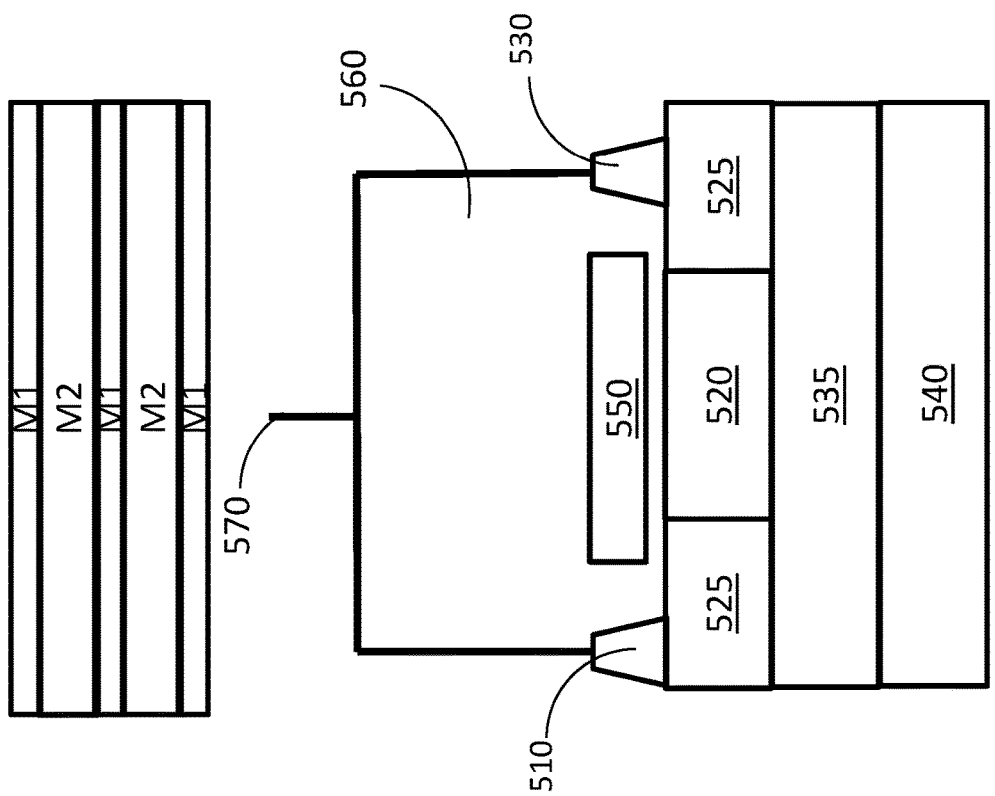
FIG. 2 is a diagram of a first exemplary RSE, having metal layers to control the dependence of radiation sensitivity on incident particle energy.

FIG. 2 is a diagram of a first exemplary RSE, having metal layers to control the dependence of radiation sensitivity on incident particle type and energy. The main MOSFET components—source 510, shallow trench isolation (STI) dielectric 520, drain 530, n-wells (NW) 525, deep n-well (DNW) 535, substrate (SUB) 540, floating gate (FG) 550, oxide 560, and control gate (CG) electrode 570—are known to those skilled in the art of MOSFET technology. In an RSE, the thickness of STI dielectric 520 is typically about 3500 Angstroms.

The radiation sensitivity of the RSE is governed by the fraction of incident particles (including photons) impinging on the RSE which form electron-hole pairs and discharge the FG voltage. In FIG. 2, metal layers M1 and M2 are used to control the absorption of incident particles. The metal layers may be placed outside the area of oxide 560, as shown in FIG. 2, or alternatively, inside the area of oxide 560, between FG 550 and CG 570.

The number of metal layers, and their position, material composition, and thickness, are design parameters that may be varied in order to control the fraction of incident particles absorbed in the metal layers, for a range of particle types and particle energies.

In general, the penetration depth of incident particles into the metal layers increases with particle energy and decreases with atomic number (Z) of the metal layers. By way of example, metal layer M1 may consist of aluminum, for which Z=13, and metal layer M2 may consist of copper, for which Z=29.

Figure 3:
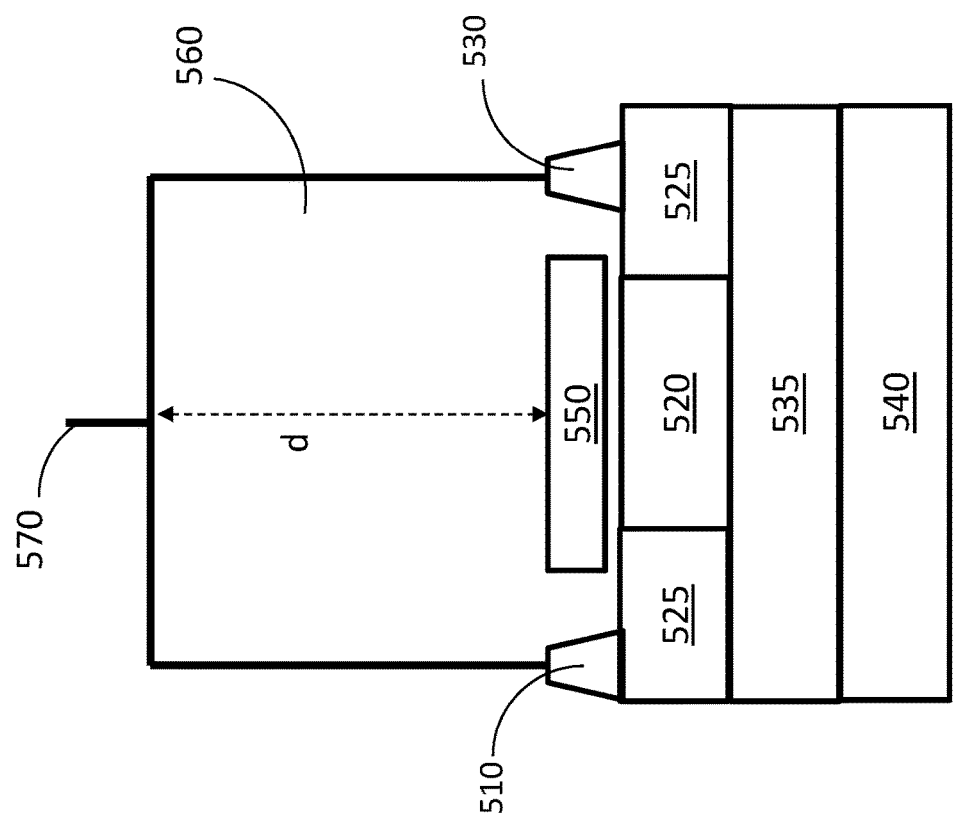
FIG. 3 is a diagram of a second exemplary RSE, having variable gate oxide thickness to control the dependence of radiation sensitivity on incident particle energy.

FIG. 3 is a diagram of a second exemplary RSE, in which the radiation sensitivity is controlled by the thickness "d" of oxide 560. Like reference numbers in FIG. 3 have the same meaning as in FIG. 2. In a manner similar to the metal layers of FIG. 2, the thick oxide layer absorbs a fraction of the particles of the incident radiation, thus controlling the formation of electron-hole pairs near FG 570, and thus controlling the magnitude of the RSE voltage drop in response to incident radiation.

By proper design of the metal layers in FIG. 2 and/or the oxide thickness "d" in FIG. 3, it is possible to make the voltage response of the RSE substantially uniform over a range of incident particle energies, so that the measured voltage drop will depend upon the absorbed radiation dose but not upon the incident particle energy. This characteristic is referred to as "energy flattening" by those skilled in the field of radiation dosimetry.

In an RIE, the MOSFET architecture is similar to that shown in FIGS. 2 and 3, except that the dimensions and composition of the MOSFET components are different. For example, in an RIE, STI dielectric 520 is replaced by a thin gate oxide layer, having a thickness of about 70 to 100 Angstroms. Also, the width of FG 520 is smaller in the RIE, yielding an RIE capacitance that is only about one-tenth of the RSE capacitance.

Figure 4:
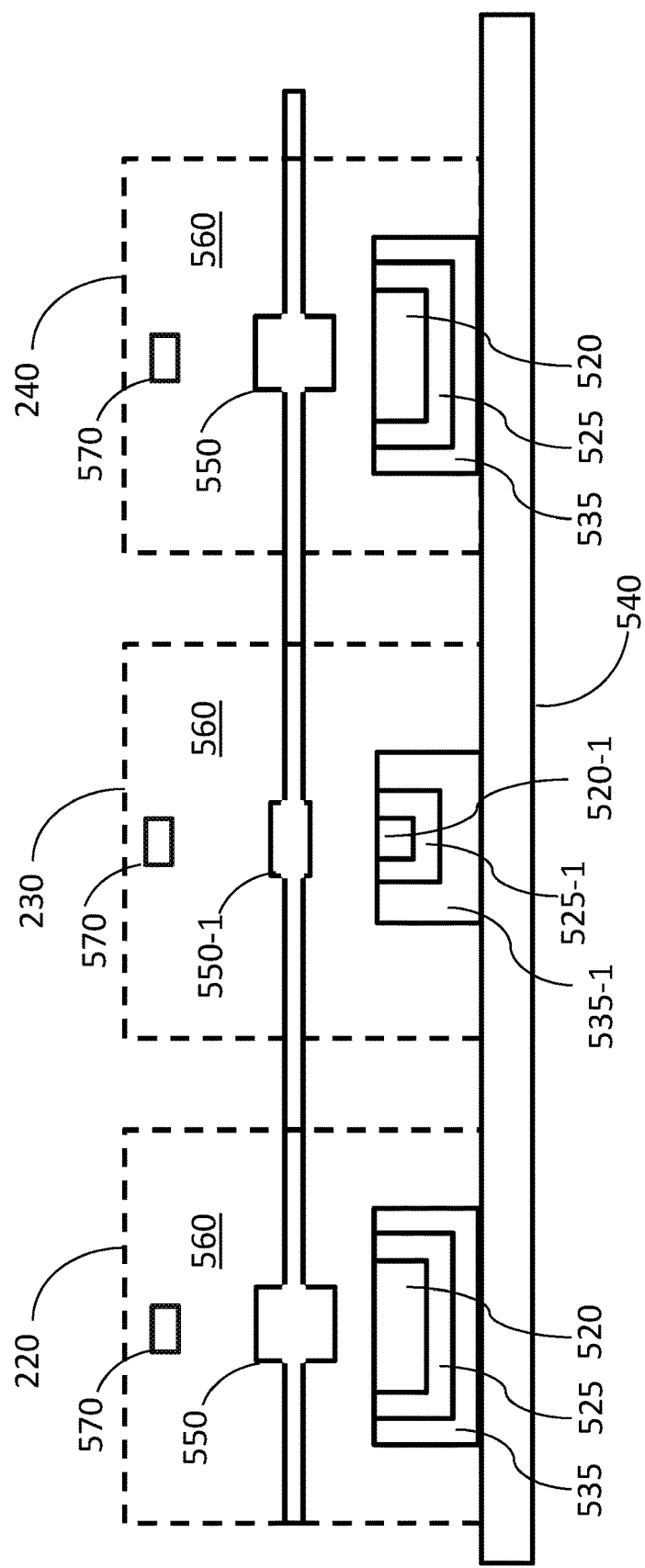
FIG. 4 is a diagram of two exemplary RSEs and an exemplary RIE mounted on a single substrate.

FIG. 4 is a diagram of two exemplary RSEs and an exemplary RIE mounted on a single substrate. The same reference numbers are used as in FIGS. 1-3. Substrate 540 is common to RSEs 220 and 240 and RIE 230. In RIE 230, gate oxide 520-1, NW 525-1, DNW 530-1, and floating gate 550-1 are scaled down in size as compared with corresponding structures in RSEs 220 and 240.

FIG. 5 is an exemplary switching matrix for changing the operational mode of the sensor by means of voltages which are generated by the reader and communicated to switching channel 270. The elements of the switching matrix represent voltage levels (in volts, V) applied to the contacts of the sensor RSEs and RIEs via switching channel 270. Typically, the voltage levels needed to change the sensor mode of operation persist for a period of several milliseconds. One of the key functions of the switching matrix and of switching channel 270 is to protect the sensor from damage due to electrostatic discharge (ESD) and from unintentional charging.

In the Discharge, Pre-charge, and Read modes, the reader provides electrical power to the sensor via the switching channel. Once the sensor is in Idle mode, the sensor no longer needs electrical power from the reader, and the switching channel may be disconnected. The sensor continues to operate passively, and at a remote distance from the reader.

Prior to radiation exposure and with the switching channel connected, the floating gates of the RSEs and RIE are charged to initial, desired voltage levels by implementing Discharge mode followed by Pre-charge mode. In Discharge mode, charge flows through the gate oxide from the FG to the substrate, effectively discharging the FG capacitor. In Pre-charge mode, the applied voltages generate a tunneling current through the gate oxide which injects charge to the FG. After several milliseconds, the FG capacitor reaches a desired initial voltage. At this point, the sensor may be switched to Idle mode and the switching channel disconnected.

While in Idle mode, the sensor is exposed to incident radiation. The effect of ionizing radiation is to discharge the FG control capacitor, whose capacitance is approximately 10 times greater than all other capacitors in the sensor. Based upon well-known capacitive voltage divider relations, about 90% of the voltage applied to the CG is transferred to the FG. The discharge of the FG by ionizing radiation occurs mainly in the region of the large control capacitor. As the absorbed radiation dose increases, the FG capacitor is progressively discharged, and the FG voltage diminishes.

After an elapsed time interval, the switching channel is reconnected in order to place the sensor in Read mode. In this mode, for each of the RSEs and the RIE, the tunneling gate (TG) and substrate (SUB) contacts are shorted, and the CG and DNW contacts are shorted. A reference voltage Vg is supplied to the CG electrode and the drain voltage (Vd) is obtained from the NMOS drain (ND) electrode and passed in analog form to the reader over switching channel 270. In the reader, Vd is converted to a digital value by ADC 320 and processed in DSP 330. The result is a calculated value of the remaining drain voltage for each of the RSEs and the RIE.

The act of reading the sensor voltages does not alter them. Thus, if the absorbed radiation dose in a single exposure time interval is small, it is possible to read the sensor many times after a single pre-charge operation.

Figure 6:
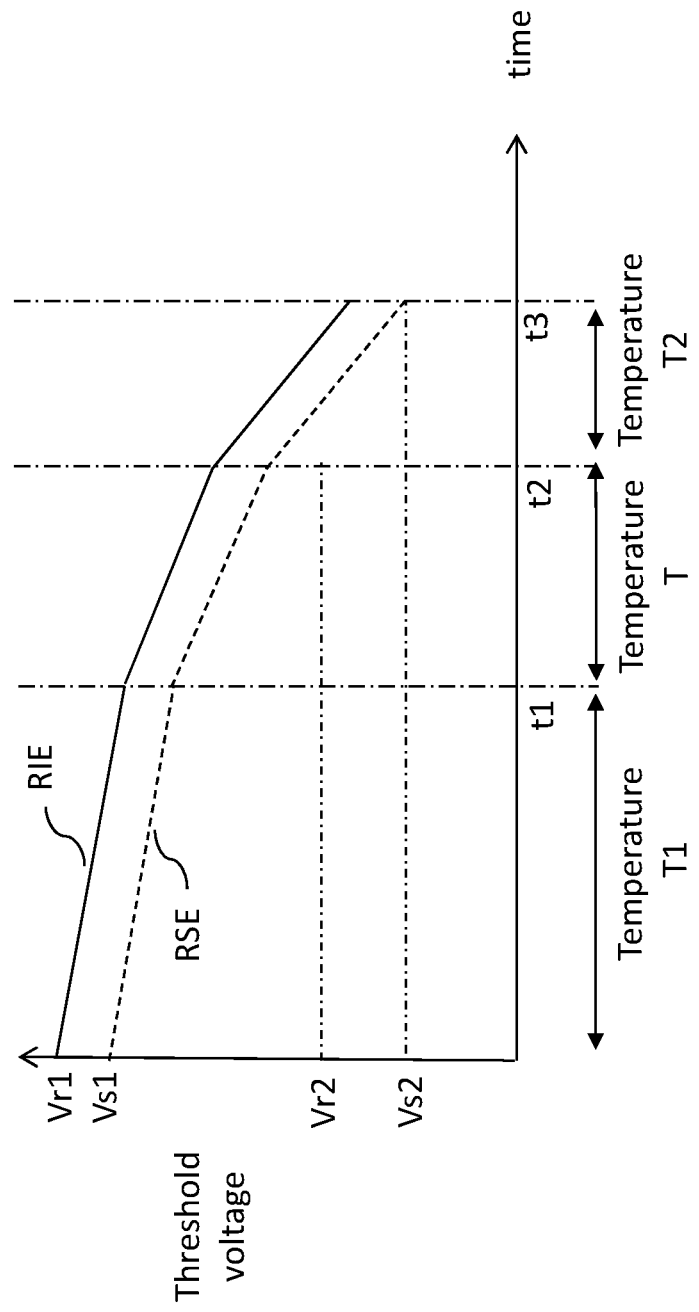
FIG. 6 is a graph showing the voltage of an exemplary RSE and an exemplary RIE, as a function of time, at two values of ambient temperature, in the absence of incident radiation.

FIG. 6 illustrates the principle of matching the voltage retention loss of the RSE to that of the RIE over a range of operating temperature. The graph shows the voltage of an exemplary RSE and an exemplary RIE, as a function of time, in the absence of incident radiation. As time progresses, the operating temperature changes from T1 to T to T2, where $T1 \leq T \leq T2$.

Prior to radiation exposure, the RSE and RIE are pre-charged and their voltages are recorded in the reader. These initial voltages are denoted by Vs1 and Vr1, respectively. At the end of the measurement time interval, the reader measures and records the corresponding final voltages, Vs2 and Vr2. If the voltage retention loss of the RSE and the RIE are matched, or more generally proportional, to each other, then the RSE voltage drop, Vs12=Vs1−Vs2, is approximately equal to the RIE voltage drop, Vr12=Vr1−Vr2. This is a consequence of the fact that the time rate of change, or slope, of the RSE voltage is the same as that of the RIE voltage over the range of operating temperature from T1 to T2.

Figure 7:
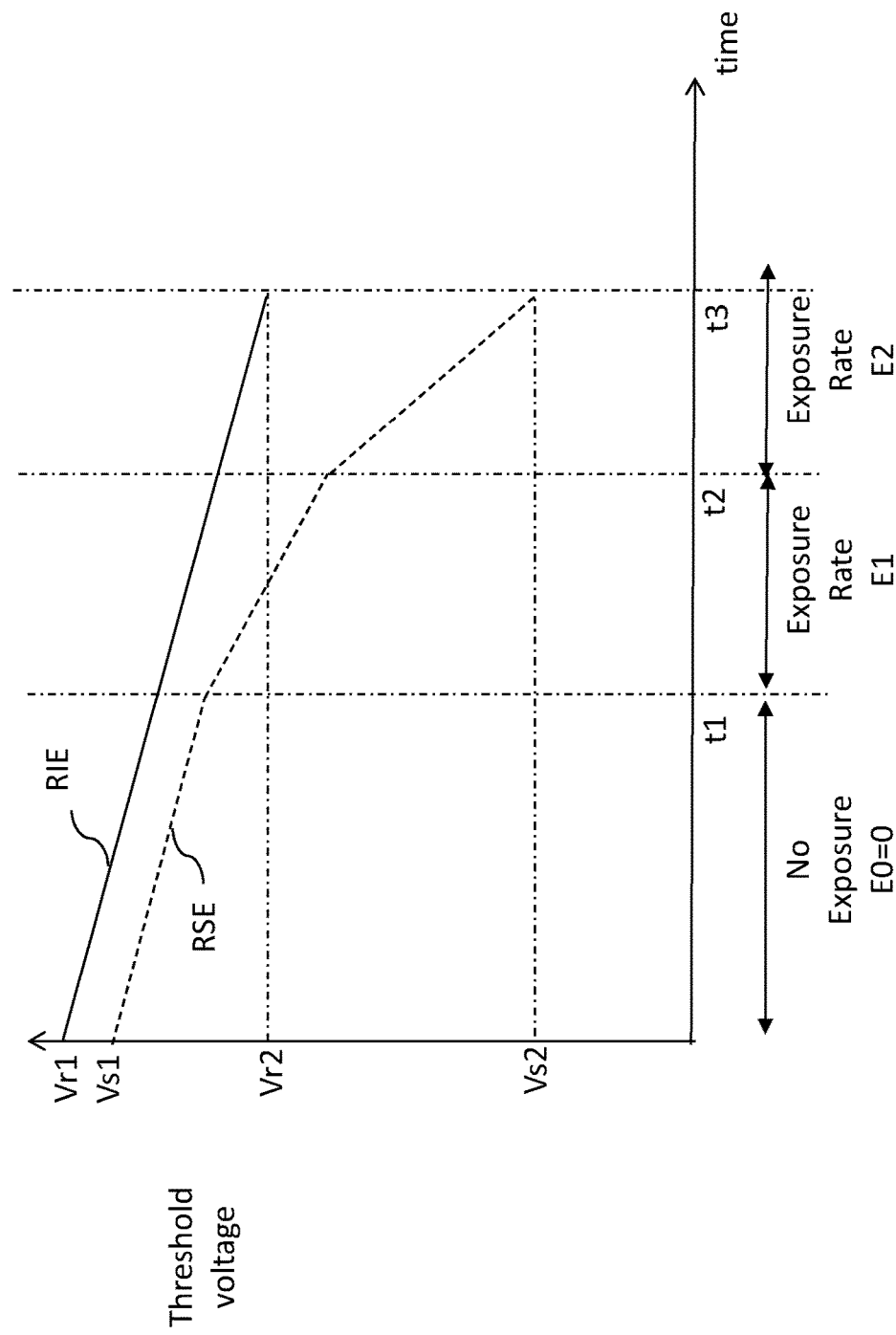
FIG. 7 is a graph showing the voltage of an exemplary RSE and an exemplary RIE, as a function of time, at three incident radiation exposure rates.

FIG. 7 is a graph showing the voltage of an exemplary RSE and an exemplary RIE, as a function of time, when exposed to incident radiation. The radiation exposure rate increases from 0 to E1 at time t1, and increases again from E1 to E2, at time t2. The slope of the solid line labeled RIE is the same throughout, because the RIE is insensitive to incident radiation. The slope of the dashed line labeled RSE is initially the same as that of the RIE, when E=0. However, as the radiation exposure rate increases above zero, the RSE slope becomes steeper. The steepness is an indication of the RSE's sensitivity to radiation.

At the end of the measurement time interval, the reader measures and records the final voltages, Vs2 and Vr2, and, as before, calculates the RSE voltage drop, Vs12=Vs1−Vs2, and the RIE voltage drop, Vr12=Vr1−Vr2. The voltage drop corrected for voltage retention loss, which is attributed to the incident radiation alone, is given by Vs12'=Vs12−Vr12.

Figure 8:
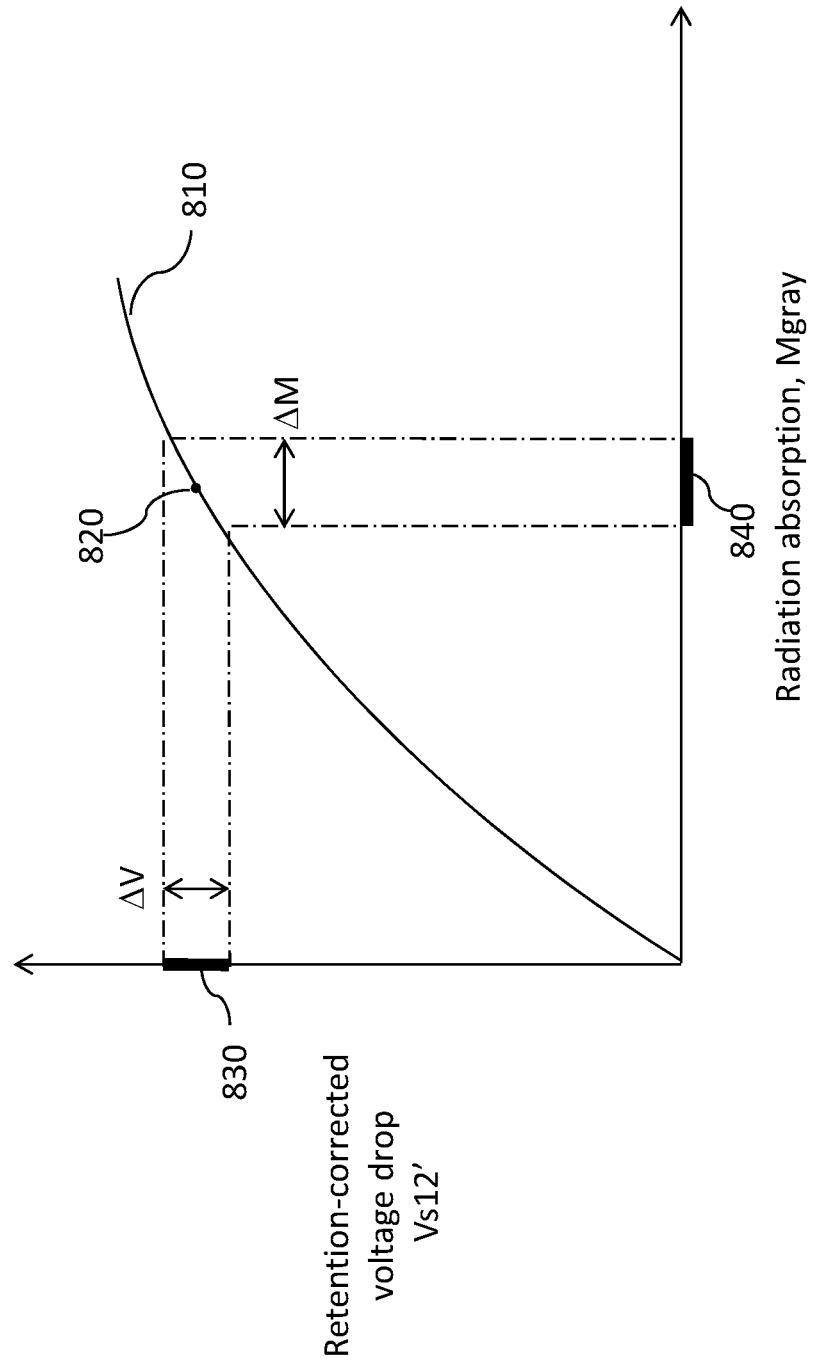
FIG. 8 is a graph showing an exemplary calibration curve.

A pre-determined calibration curve, which is typically stored in the DSP, is used to convert Vs12' to a measurement of absorbed radiation, denoted by Mgray. FIG. 8 shows an exemplary calibration curve. In the figure, curve 810 shows the functional relationship between Mgray, on the horizontal axis, and Vs12', on the vertical axis. Point 820 shows a sample measurement point on the curve.

The effect of measurement errors is illustrated by means of line segments 830 and 840. Physical voltage measurements made by the reader are generally of limited accuracy. As a result, the calculated value of Vs12' is in fact a random variable, having a distribution of values. This distribution extends over an interval of width ΔV, which is illustrated by line segment 830, and may correspond, for example, to ±1 standard deviation from the calculated value of Vs12'. By the graphical construction shown in dot-dash lines, one can determine as associated interval of width ΔM and line segment 840 for the random value Mgray. Exemplary values of ΔV and ΔM are 10 microvolts and 100 micro-Grays.

FIG. 9 is a flow chart showing an exemplary method of operation 900 for the radiation dosimetry system of FIG. 1. In the flow chart, the sensor voltages, Vs1 and Vs2, and the absorbed radiation measurement, Mgray, are vectors whose dimension is equal to the number of RSEs in the sensor. Steps 910-980 are self-explanatory. In step 990, voltage retention loss corrected sensor voltage drop vector Vs12' is converted to a radiation absorption measurement vector, Mgray. Mgray may then be passed to external peripheral devices via peripheral interface 360.

In step 995, the sensor voltages are checked against a cutoff value, to see if enough charge remains on the RIE and each of the RSE's to continue radiation measurements. If all of the sensor voltages are above the cutoff, then the "Yes" path is taken. If any of the sensor voltages is below cutoff, then the "No" path is taken, and the Sensor is pre-charged.

Typically, sensors with multiple RSEs are designed to cover several different bands of incident particle energy. Let N denote the number of RSEs and E(n), n=1, 2, . . . N, denote the center of the energy band corresponding to the energy selectivity of the n-th RSE. Using an energy weighting function, W(E), one may compute a personal dose equivalent:

$$Msievert=\Sigma W(E(n))\times Mgray(n)/\Sigma W(E(n))$$

where the summations Σ are over n=1, 2, . . . N. Thus, step 990 may optionally include calculating Msievert and communicating its value to external peripheral devices via peripheral interface 360.

Recommendations for the energy weighting function W(E) have been published by the International Commission on Radiological Protection for the use of practitioners in the field of radiation dosimetry.

It will be appreciated that the above descriptions are intended only to serve as examples, and that many other embodiments are possible within the scope of the present invention as defined in the appended claims.

The invention claimed is:

1. A radiation dosimeter with a passive radiation sensor comprising:
    (a) a radiation-sensitive element, hereinafter RSE, configured to be charged to a first voltage which is responsive to incident radiation and to a first voltage retention loss;
    (b) a radiation-insensitive element, hereinafter RIE, configured to be charged to a second voltage which is responsive to a second voltage retention loss; and
    (c) a sensor interface associated with both said RSE and said RIE so to enable communication with an external reader;
wherein said first voltage retention loss is proportional to said second voltage retention loss over an operative range of temperature.

2. The radiation dosimeter of claim 1, wherein said sensor comprises one or more additional RSEs.

3. The radiation dosimeter of claim 1, wherein said RSE and said RIE comprise floating gate MOSFETs.

4. The radiation dosimeter of claim 1, wherein said operative temperature range is from −40 to +60 degrees Celsius.

5. The radiation dosimeter of claim 1, wherein a response of said first voltage to incident radiation is substantially uniform over an operative range of incident radiation particle energies.

6. The radiation dosimeter of claim 5, wherein said operative range of incident radiation particle energies is from 20 kilo-electron-volts to 3 mega-electron-volts.

7. The radiation dosimeter of claim 1 comprising a reader which further comprises an electrical power source, a digital signal processor, and a reader interface.

8. The radiation dosimeter of claim 7 wherein said digital signal processor is configured to calculate a voltage retention loss corrected voltage drop.

9. The radiation dosimeter of claim 7 wherein said digital signal processor comprises a pre-determined calibration curve relating said voltage retention loss corrected voltage drop to a quantity of absorbed radiation.

10. The radiation dosimeter of claim 7 comprising a switchable channel configured to transfer electrical signals and electrical power between said sensor and said reader.

11. The radiation dosimeter of claim 10, wherein said electrical signals comprise voltages of said RSE and said RIE.

12. The radiation dosimeter of claim 10, wherein said switchable channel comprises at least one electromechanical relay.

13. The radiation dosimeter of claim 10, wherein said switchable channel comprises a wireless communication link.

14. The radiation dosimeter of claim 10, wherein said switchable channel comprises a universal serial bus.

15. The radiation dosimeter of claim 10, wherein said switchable channel comprises a cradle.

16. The radiation dosimeter of claim 10, wherein said sensor, said reader, and said switchable channel are integrated into a single unit.

17. A method for operating a radiation dosimeter, comprising the steps of:
    (a) Providing a sensor having at least one radiation-sensitive element, hereinafter RSE, a radiation-insensitive element, hereinafter RIE, and a sensor interface associated with said at least one RSE and said RIE;

(b) Providing a reader comprising an electrical power source, a digital signal processor, and a reader interface;

(c) Providing a switchable channel in communication with said reader and said sensor;

(d) Enabling a transfer of electrical signals and electrical power between said reader and said sensor;

(e) Pre-charging said at least one RSE and said RIE;

(f) Measuring a pre-exposure sensor vector, Vs1, whose components correspond to the voltage(s) of said at least one RSE;

(g) Measuring a pre-exposure reference value, Vr1, corresponding to the voltage of said RIE;

(h) Disabling the transfer of electrical signals and electrical power between said reader and said sensor;

(i) Exposing said sensor to incident radiation over an interval of time;

(j) Re-enabling the transfer of electrical signals and electrical power between said sensor and said reader;

(k) Measuring a post-exposure sensor vector, Vs2, whose components correspond to the voltage(s) of said at least one RSE;

(l) Measuring a post-exposure reference value, Vr2, corresponding to the voltage of said RIE;

(m) Calculating a sensor voltage drop vector, Vs12, equal to Vs1−Vs2;

(n) Calculating a reference voltage drop value, Vr12, equal to Vr1−Vr2;

(o) Calculating a voltage retention loss corrected sensor voltage drop vector, Vs12'; and (p) Converting said Vs12' to a radiation absorption measurement vector, Mgray.

18. The method according to claim 17 comprising an additional step (q) to calculate a personal radiation dose measurement value, Msievert.

19. The method according to claim 17 wherein steps (d) through (p) are repeated to determine a time sequence of radiation absorption measurement vectors.

20. The method according to claim 18 wherein steps (d) through (q) are repeated to determine a time sequence of personal radiation dose measurement values.

* * * * *